RE 25211
July 18, 1961  H. W. FELLBERG  2,992,652
SAFETY VALVE
Filed Nov. 1, 1956  2 Sheets-Sheet 1
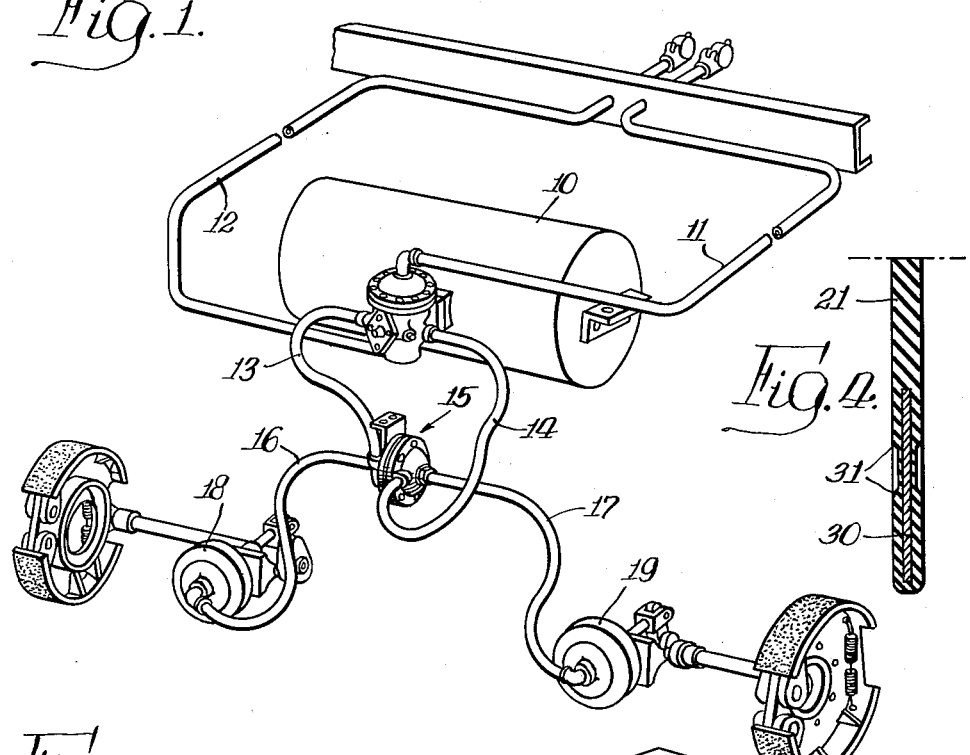
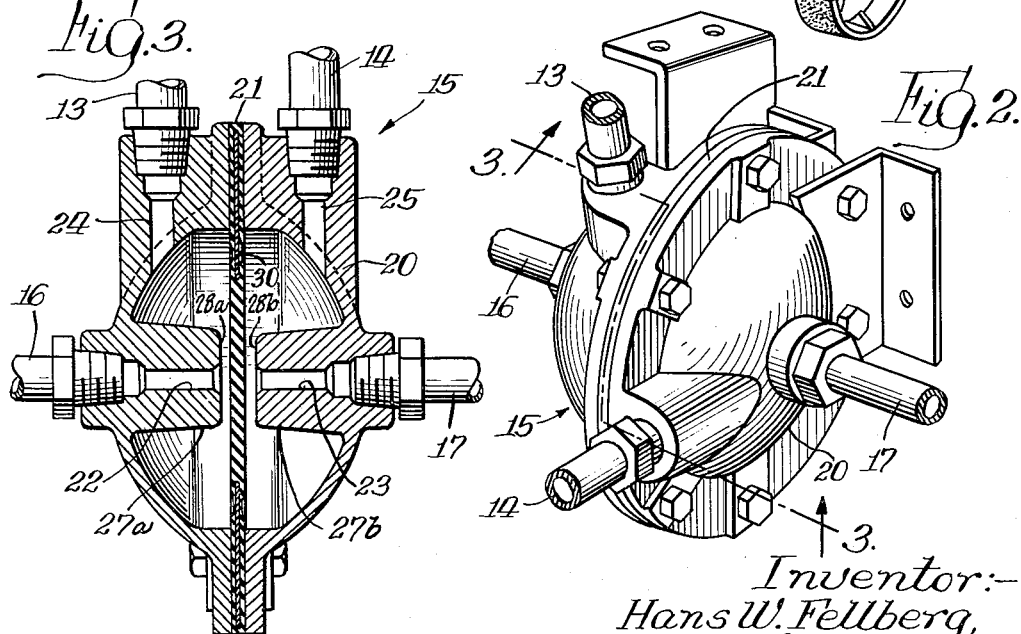
Inventor:—
Hans W. Fellberg,
By Fidler, Crouse &
Beardsley Atty's.

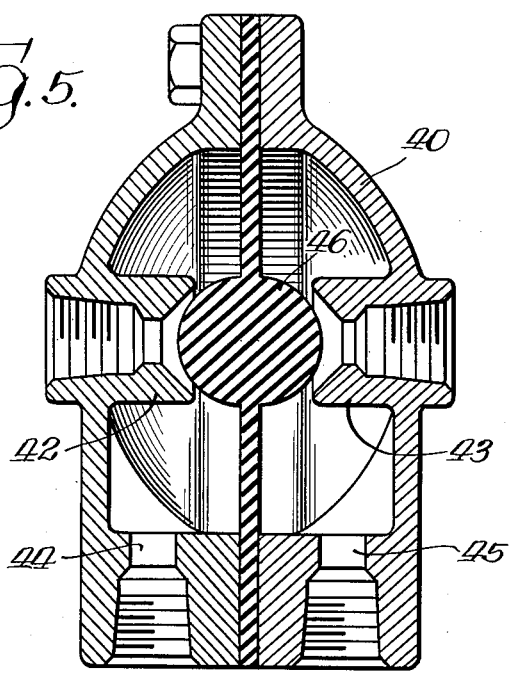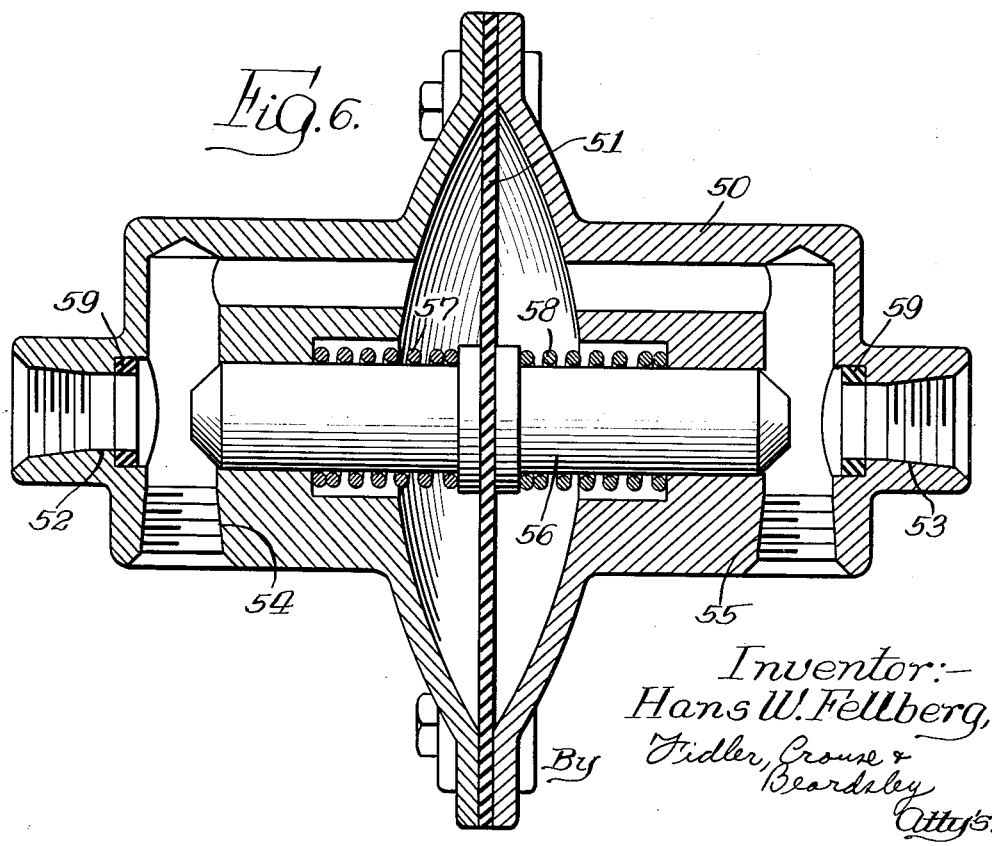

… … …

United States Patent Office 2,992,652
Patented July 18, 1961

2,992,652
SAFETY VALVE
Hans W. Fellberg, Park Ridge, Ill., assignor, by mesne assignments, of one-half each to Louis F. Guenther and Wallace F. Mitchell, doing business as Guenther-Mitchell Engineering Company
Filed Nov. 1, 1956, Ser. No. 620,162
7 Claims. (Cl. 137—118)

This invention relates to a safety valve, and in particular to a safety valve for use in an air brake system wherein a plurality of air brakes are energized from a common source of pressurized air, such safety valve protecting against the loss of air pressure in the event of a rupture of an air line feeding any one of said air brakes. It is an object of the invention to provide an improved safety valve of such character.

The invention is particularly applicable to air brake systems for trucks of various types including trailer trucks and semi-trailer trucks. In air brake systems for such vehicles there is a longstanding problem which has not been solved by any prior art devices. In the present air brake systems, if an air line carrying compressed air from a common source to one air brake should rupture, air escapes through the ruptured line with the result that all of the air brakes fail to operate because of the lack of sufficient pressure within the system. In practice, such failures occur frequently and have resulted in numerous disasters.

A safety valve constructed in accordance with the present invention and employed in the preferred manner passes compressed air from the common source to two air brakes, or to two pairs of air brakes on two axles of a vehicle, and automatically cuts off the flow of air to any portion of the air brake system in the event of a rupture in that portion of the system. Accordingly compressed air from the common source is not permitted to escape from the ruptured line but is conserved such that it may actuate the remaining, operative portions of the air brake system. Accordingly, if the air line to one air brake should rupture, the flow of air to that air brake, or to both air brakes of the associated axle, is cut off such that the compressed air is conserved for normal operation of the air brakes on the remaining wheels or axles.

A safety valve constructed according to the present invention performs the above-described functions efficiently and reliably whereby it completely solves the above referred to and previously unsolved problem of providing effective braking in the event of rupture of an air line. As will become apparent following a description of various embodiments of the invention, a safety valve constructed in accordance with the present invention may be employed to advantage in various applications other than that referred to above.

It is another object of the invention to provide an improved safety valve which normally passes air from a common pressure source to a pair of air brakes but which automatically and instantaneously cuts off air flow to either air brake in the event of a rupture of the line feeding that brake. It is another object of the invention to provide improved valve apparatus of this character which returns automatically to its normal operating condition when the air pressure from the pressure source is released.

It is a further object of the invention to provide a novel form of diaphragm for such a safety valve, which diaphragm does not distort when its edge portions are firmly clamped between hard surfaces.

It is still another object of the invention to provide an improved diaphragm for a safety valve such as that described above which resists blow-out in the event of a large pressure differential.

It is a still further object of the invention to provide an improved safety valve having the characteristics defined above while being reliable in operation after long periods of use during which it is not called upon to operate.

This invention, together with further objects and advantages thereof, will best be understood by reference to the following description taken in connection with the accompanying drawings, and its scope will be pointed out in the appended claims.

In the drawings, in which like parts are designated by like reference numerals:

FIGURE 1 is a schematic perspective view of an air brake system incorporating one embodiment of the present invention;

FIG. 2 is a perspective view of a safety valve illustrating one embodiment of the invention;

FIG. 3 is a cross-sectional view taken along the line 3—3 of FIG. 2;

FIG. 4 is an enlarged partial cross-sectional view of the diaphragm employed in the safety valve of FIGS. 1–3;

FIG. 5 is a cross-sectional view of a safety valve illustrating another embodiment of the invention; and FIG. 6 is a cross-sectional view of a safety valve illustrating a third embodiment of the invention.

As indicated above, the present invention is well adapted to use in an air brake system and it is disclosed in FIG. 1 in such an application. A reservoir 10 may be seen in FIG. 1 from which various conduits 11, 12, 13 and 14 carry compressed air to a plurality of air brakes. Two lines 13 and 14 carry compressed air to a safety valve 15 which constitutes the present invention. Also connected to the safety valve 15 are a pair of lines 16 and 17 which carry compressed air from the safety valve to a pair of air brakes which, in the present instance, constitute a pair of individual air brakes 18 and 19. The latter are operatively connected to suitable braking apparatus as shown.

The function of the safety valve 15 is to permit the passage of air from the line 13 to the line 16 and from the line 14 to the line 17 when the air brakes are working properly and to prevent the flow of air to either one of the lines 16 or 17 in the event that the associated brake apparatus 18 or 19 may have ruptured. For example, if the line 16 should rupture or if the associated brake 18 should fail and permit free escape of air, the safety valve will instantly move to prevent the flow of compressed air from the line 13 into the line 16. This prevents the escape of air and consequent reduction of air pressure which would otherwise occur, whereby the remaining brakes, for example, the air brake 19, may still be supplied with air at proper pressure. Lacking such apparatus as the safety valve 15, a substantial leak in any part of the air brake system may permit rapid escape of compressed air such that the entire air brake system fails to operate.

As indicated above, the two devices of FIG. 1 to which the safety valve 15 controls the flow of air constitute a pair of single air brake devices. Alternatively the two loads to which the safety valve 15 may control the flow of air may each comprise a pair of air brakes for one axle of a truck or other vehicle. In the latter case, rupture of a line to one air brake would cause the safety valve to cut off the flow of compressed air to both brakes for the corresponding axle, and would continue to pass air to the two brakes for the other axle. The safety valve 15 may be employed in multiple to control the flow of compressed air to any number of single air brakes or pairs of air brakes, any one of which may be cut off in the event of a rupture in the line leading thereto. This may be accomplished simply by providing one safety valve for each two brakes or each two pairs of brakes.

The safety valve 15 of FIG. 1 is shown in detail in

FIGS. 2, 3, and 4 where it will be seen that the valve consists of a split housing 20 forming an air tight enclosure which is divided into two compartments by a rubber-like diaphragm 21. The edges of the diaphragm 21 are clamped between the two halves of the split housing 20, the two halves of the housing being firmly secured together as shown. Outlet openings 22 and 23, connectible to lines 16 and 17, are arranged in opposed relationship and symmetrically with respect to the diaphragm 21. Inlet openings 24 and 25 are arranged to enter the respective chambers of the housing 20, these openings being connectible to the lines 13 and 14.

It will now be seen that compressed air may pass through the line 13, through the inlet opening 24 and into the left-hand chamber of the valve. Assuming that the diaphragm 21 is in its normal position the compressed air may pass through the outlet opening 22 and through the line 16 to the air brake 18. Similarly, compressed air may pass from the line 14 through the inlet opening 25 and into the right-hand chamber of the housing. Again assuming that the diaphragm 21 is in its normal position this air may pass through the outlet opening 23 and the line 17 to the air brake 19.

However, the diaphragm 21 is subject to substantial deflection either to the right or to the left in response to any substantial difference in air pressure within the two chambers. Accordingly, if the line 16 should rupture, air would pass quickly out of the left-hand chamber through the outlet opening 22 with the result that pressure in the left-hand chamber would drop very substantially and very quickly. In such case the higher pressure within the right-hand chamber would force the diaphragm 21 instantly to the left and against the end surface of the boss 27 through which the outlet opening 22 extends. This prevents further flow of air through the outlet opening 22 and hence conserves compressed air for normal operation of the remaining air brakes.

It will be noted that as soon as the outlet opening 22 is sealed off by the diaphragm 21, the pressure within the left-hand chamber will quickly rise to its normal high value. However, the diaphragm 21 will nevertheless remain in contact with the boss 27 and will continue to prevent outward movement of air therethrough because of the fact that the area of the diaphragm which is exposed to air pressure in the left-hand chamber is substantially reduced. More particularly, it is reduced to the extent of the area of the inner face of the outlet opening 22. In the illustrated embodiment of the invention this area is made substantial by providing large diameter cylindrical bosses 27a and 27b, preferably integral with the housing halves, through which the outlet openings 22 and 23 extend. The resulting annular faces or seats 28a and 28b surrounding the outlet openings and against which the diaphragm may bear, may be seen to be of substantial area.

When the air pressure as supplied to the valve apparatus 15 through the lines 13 and 14 is relieved, as upon release of the brake control, the pressure within the left and right-hand chambers returns to normal whereupon the pressure on opposite sides of the diaphragm becomes substantially equal. Since the diaphragm is resilient and tends to return to its normal position intermediate the seats 27a and 27b the diaphragm will then return to its normal position. Accordingly, no manual operation is required to return the valve apparatus to normal operating condition. It will be apparent that upon re-application of the air brakes the diaphragm 21 will again move against the seat 28a if the rupture has not been repaired.

Since the safety valve 15 is essentially symmetrical about its center line, it is believed to be unnecessary to describe in detail the operation of the device in the event that the air brake 19 or the conduit 17 should develop a substantial leak. It will be apparent that the diaphragm 21 will move against the seat 28b to prevent further flow therethrough and will remain in contact therewith until the air pressure is released.

The preferred construction of the diaphragm 21 may be seen best in FIG. 4. Embedded within the rubber-like diaphragm 21 is a steel plate 30 in the form of a continuous, wide ring. This plate makes the outer portions of the diaphragm 21 substantially inflexible, whereby flexure of the diaphragm occurs almost exclusively over the central portion thereof. Among other advantages of this form of diaphragm is the prevention of diaphragm distortion when the diaphragm is clamped between the two halves of the split housing 20. As is well recognized in the art, if a simple rubber-like diaphragm is clamped at its edges, the rubber tends to flow inwardly of the outer, annular, clamped portion with the result that the central suspended portion of the diaphragm is warped. This tends to make the diaphragm unstable under the influence of flowing air, twists the diaphragm askew of the inner planar surfaces of the bosses 27a and 27b, and otherwise makes it difficult to predetermine the air pressure differential which will cause the diaphragm to close either of the outlet openings. In an application such as the safety valve 15, such warping may even cause the central portion of the diaphragm to bear against one of the outlet openings with no pressure differential, whereby one brake would be rendered inoperative.

When the diaphragm of FIG. 4 is clamped at its edges between the two halves of the split housing 20, the rubber is substantially prevented from flowing inwardly since it is bonded securely to the steel plate 30. Further to prevent any distortion of the effective portion of the diaphragm, the rubber is made of reduced thickness on both sides of the steel plate over an area 31. Any slight flowing of rubber near the edge of the diaphragm cannot be carried past this area of reduced rubber thickness. Accordingly, the rubber of the diaphragm 21 adjacent the inner edge of the steel ring 30 is unaffected by the clamping action of the housing, whereby the central flexible portion of the diaphragm 21 will normally lie in a planar position and will respond in a predeterminable manner to any pressure differentials.

It will be noted further that the reduction in diameter of the effectively resilient portion of the diaphragm by use of the steel ring 30, reduces the effective area responsive to pressure differential and accordingly increases the percentage of effective area which will be in contact with either of the bosses 27a and 27b when the diaphragm is forced thereagainst. Accordingly the diaphragm will be held positively in cut-off position when the pressure in the corresponding chamber of the housing 20 returns to its normal high value.

The main body of the diaphragm is preferably of synthetic rubber, such as neoprene, having long life in the presence of alkalies and other agents which are detrimental to many rubber-like materials.

The inner configuration of the housing 20 is preferably of a generally spherical form, or at least rounded, as shown in FIG. 3 in order to reduce air turbulence when air is passing therethrough. This reduces air pressure drop across the valve apparatus.

The embodiment of the invention illustrated in FIG. 5 is generally similar to that shown in FIGS. 1–4. It has a housing 40 forming an airtight enclosure which is divided into two chambers by a diaphragm 41. Opposed outlets 42 and 43 are arranged symmetrically with respect to a diaphragm 41, and inlet openings 44 and 45 are provided, one opening into each of the two chambers. The diaphragm 41 may or may not be similar to the diaphragm 21 in having a steel ring embedded therein. The central portion of the diaphragm 41 is provided with a ball or sphere 46 of substantial size, which may be attached to or integral with the main portion of the diaphragm.

The inner faces of the outlet bosses 42 and 43 are conical and the ball 46 is of such size as to seat firmly in these conical openings whereby actuation of the diaphragm results in a very positive cut-off.

The embodiment of FIG. 6 also includes a housing 50 forming an enclosure which is divided into two chambers by a diaphragm 51. Two outlet openings 52 and 53 are arranged in opposed relationship and symmetrically about the diaphragm 51, and inlet openings 54 and 55 are provided, one for each chamber. It will be seen that while the inlet openings 54 and 55 are very close to outlet openings 52 and 53, compressed air from the openings is nevertheless applied to corresponding sides of the diaphragm through drilled passages as shown.

Secured to the diaphragm 51 is a slidably mounted plunger construction 56, the plunger construction and the diaphragm being maintained normally in a central position by counter-balanced springs 57 and 58. These springs are compression springs and bear against seats in the housing 50 at their outer ends and against a suitable flange on the plunger construction at their inner ends, all as clearly shown in FIG. 6.

In the event of a rupture in the line connected to the outlet opening 53, the pressure in the right-hand chamber will drop, and the resulting pressure differential across the diaphragm 51 will drive the diaphragm and the plunger 56 to the right against the action of the spring 58 such that the right-hand end of the plunger seats in the outlet opening 53 and cuts off the flow of air to the corresponding load device. A suitable hardened ring or valve seat 59 is arranged in each of the outlet openings 52 and 53 to provide a good seal with the plunger. Once the flow of air to the outlet opening 53 is thus cut off, the pressure in the right-hand chamber will restore to normal high pressure but the diaphragm 51 and the plunger 56 will remain in their right-hand positions since the pressure within the right-hand chamber is applied to a smaller area of the moving valve parts than is the pressure in the left-hand chamber. In particular, the right-hand end of the plunger 56 is not subjected to the pressure within the right-hand chamber but instead is exposed to the pressure within the ruptured line connected to the outlet opening 53, which pressure is presumably substantially equal to atmospheric pressure. When air pressure is released, the pressure on the two sides of the movable valve members will be substantially balanced and the spring 58 will cause the diaphragm and the plunger to return to their normal central positions. In this embodiment of the invention the diaphragm 51 is preferably of considerably less strength than the springs 57 and 58, and serves primarily to transmit forces to the plunger 56 corresponding to the pressure differential, while it is the springs 57 and 58, primarily, which resist small pressure differentials and return the plunger and the diaphragm to their central positions when the air pressure is released. The embodiment of FIG. 6 is more expensive to manufacture than the two previously described embodiments, but permits quite free passage of air from inlet openings to corresponding outlet openings.

It will be apparent to those skilled in the art that the diaphragm or other movable valve parts of the various illustrated embodiments of the invention should be of sufficient stiffness as to resist small pressure differentials which will occur in normal operation but sufficiently yielding that the pressure differential resulting from a ruptured line may force the valve rapidly and positively to cut-off position. The area of the moving valve part exposed to inlet pressure after it has moved to cut-off position must be sufficiently reduced that the resulting pressure differential will positively maintain the valve in cut-off position against the resilience of the diaphragm or springs.

Various embodiments of the invention have now been described, all operating on the same principles. Each of these embodiments serves to pass air from a source of air under pressure to an air brake or a pair of air brakes, and to prevent flow to any such air brake whose feed line may have ruptured.

In any of the embodiments of the invention described above the opposed openings which are controlled by the movable valve structure may be connected to the source of air under pressure and the other openings may be connected to the air brakes. Any combination is operable as long as one opening in each chamber is connected to the source and the other is connected to a brake, but it is preferred that the two opposed openings be connected to the brakes.

It will also be apparent that the apparatus may be employed with a single brake, if one outlet opening is connected to a balanced chamber of equal air consumption and the other three openings being connected as described above.

It will be apparent that the invention may be varied in its physical embodiment without departing from the spirit of the invention, and it is desired, therefore, that the invention be limited only by the scope of the appended claims.

The invention having thus been described, what is claimed and desired to be secured by Letters Patent is:

1. A safety valve for passing air from a common source of pressurized air to a pair of air brakes and for stopping the flow of air to either of said air brakes in the event of excessive air leakage therefrom, said valve comprising a casing having opposed wall portions defining an air tight enclosure, a resilient flexible diaphragm, means including at least a portion of said casing clampingly engaging the peripheral portion of said diaphragm and supporting the latter in normally planar position for dividing said enclosure into two compartments, and a rigid annular member coplanar with said diaphragm embedded in the portion of said diaphragm which is engaged by said clamping means and in the portion immediately inwardly thereof, said diaphragm having a section of reduced wall thickness in the portion in which said annular member is embedded, opposed outlet openings leading from said compartments respectively and through the corresponding walls, connectible to such air brakes, a seat in each compartment surrounding the outlet opening, an inlet opening in each of said compartments connectible to the common source, said diaphragm having a seating surface in each compartment arranged to move toward and against either of said outlet openings to close such outlet opening when the pressure within the corresponding compartment falls below the pressure in the other compartment by a predetermined value, each of said seats and the corresponding seating surface of the diaphragm being of substantially less area than the wall portions defining the compartments respectively whereby the effective area of said diaphragm exposed to air pressure within said corresponding chamber is substantially reduced when said diaphragm is so pressed against said outlet opening whereby said diaphragm may remain in outlet closing position under the influence of air pressure within said other compartment until the air pressure from said common source is released, said diaphragm being self-returnable to a position intermediate said outlet openings when air pressure from said common source is released.

2. A safety valve for passing air from a common source of pressurized air to a pair of air brakes and for stopping the flow of air to either of said air brakes in the event of excessive air leakage therefrom, said valve comprising a casing having opposed wall portions defining an airtight enclosure, a resilient planar diaphragm formed from rubber-like material, means including at least a portion of said casing clampingly engaging the peripheral portion of said diaphragm and supporting the latter in normally planar position dividing said enclosure into two compartments, and a rigid, annular, metal member coplanar with said diaphragm and embedded in the diaphragm in the portion thereof which is clamped and in the portion immediately inwardly thereof and bonded to the diaphragm, said diaphragm having portions of reduced wall thickness in the portion of the diaphragm in which said annular member is embedded and on opposite sides of said annular member, opposed outlets leading from said compartments respectively and through the corresponding walls, connectible to such air brakes, a seat in each compartment surrounding each of said outlets, a second opening in each of said compartments connectible to such common source, the central portion of said diaphragm being arranged to move toward and against either of said outlet seats to close such outlet when the pressure within the corresponding compartment falls below the pressure in the other compartment by a predetermined value, each of said seats and the corresponding area of said diaphragm being of substantially less area than the wall portions defining the compartments respectively, the size of said outlets being such that the area of said diaphragm exposed to air pressure within said corresponding chamber is substantially reduced when said diaphragm is so pressed against either of said outlets whereby said diaphragm may remain in outlet closing position when the pressure within the two compartments becomes equal, said diaphragm being resilient whereby it is self-returnable to a position midway between said outlets when air pressure from said common source is released.

3. A safety valve for passing air from a common source of pressurized air to a pair of air brakes and for stopping the flow of air to either of said air brakes in the event of excessive air leakage therefrom, said valve comprising a split housing having a planar joint and forming an airtight circular chamber, a resilient planar diaphragm in said casing and having an annular peripheral portion clamped in the joint of said split housing in normally planar condition, a circular portion inwardly of said annular portion dividing said enclosure into two compartments, and a rigid annular member coplanar with said diaphragm and embedded in the portion of the diaphragm which is clamped in the joint and in the portion immediately inwardly thereof and bonded thereto, said diaphragm having a section of reduced wall thickness in the portion in which said annular member is embedded, said casing having opposed outlets located centrally of respective halves of said split housing leading from said compartments respectively and connectible to such air brakes, a seat in each compartment surrounding the corresponding outlet, a second opening in each of said compartments connectible to said common source, said diaphragm having a sealing surface in each compartment arranged to move toward and against either of said seats to close the outlet when the pressure within the corresponding compartment falls below the pressure in the other compartment by a predetermined value, each of said seats and the corresponding seating surfaces being of substantially less area than the wall portions defining the compartments respectively, the size of said outlets being such that the area of said diaphragm exposed to air pressure within said corresponding chamber is at least substantially reduced when said diaphragm is so pressed against said seat whereby said diaphragm may remain in outlet closing position when the pressure within the two compartments becomes equal, said diaphragm being resilient whereby it is self-returnable to a position midway between said outlets when air pressure from said common source is released.

4. A safety valve for passing air from a common source of pressurized air to a pair of air brakes and for stopping the flow of air to either of said air brakes in the event of excessive air leakage therefrom, said valve comprising a split housing having a planar joint and forming an airtight circular enclosure, a resilient, generally planar diaphragm supported between said outlets and having an inner circular portion dividing said enclosure into two compartments, the edges of said diaphragm outwardly of said inner portion being clamped in the joint of said split housing with the diaphragm in normally planar condition, opposed outlets located centrally of respective halves of said split housing leading from said compartments respectively and connectible to such air brakes, a seat in each compartment surrounding the corresponding outlet, a second opening in each of said compartments connectible to said common source, said diaphragm having a sealing surface in each compartment arranged to move toward and against either of said seats to close the outlet when the pressure within the corresponding compartment falls below the pressure in the other compartment by a predetermined value, each of said seats and the corresponding seating surfaces being of substantially less area than the wall portions defining the compartments respectively, the size of said outlets being such that the area of said diaphragm exposed to air pressure within said corresponding chamber is at least substantially reduced when said diaphragm is so pressed against said seats, whereby said diaphragm may remain in outlet closing position when the pressure within the two compartments becomes equal, said diaphragm being resilient whereby it is self-returnable to a position midway between said outlets when air pressure from said common source is released, said diaphragm comprising a sheet of rubber-like material and an annular member of rigid material embedded within and coplanar with said sheet and bonded thereto, said ring extending outwardly substantially to the clamped edges of said sheet and inwardly beyond the portions of said sheet engageable by said split housing and said diaphragm having a section of reduced wall thickness in the portion in which said annular member is embedded.

5. A safety valve for passing air from a common source of pressurized air to a pair of air brakes and for stopping the flow of air to either of said air brakes in the event of excessive air leakage therefrom, said valve comprising a casing having opposed sections secured together to define an airtight enclosure, a resilient, flexible, planar diaphragm clamped at its periphery between said casing sections in normally planar condition and said enclosure to divide said enclosure into two compartments, said diaphragm having a section of reduced wall thickness in said enclosure and an annular member embedded in said diaphragm and coplanar therewith and bonded thereto, said annular member extending outwardly into the clamped portion of the diaphragm and inwardly beyond the section of reduced wall thickness but terminating short of the central portion of the diaphragm whereby the latter is flexible, inlet openings leading into said compartments respectively, a seat in each compartment surrounding the corresponding outlet opening connectible to such common source and said outlet openings being connectible respectively to different air brakes, said central portion of said diaphragm having a sealing surface in each compartment arranged to move toward and against either of said seats to close the opening when the pressure within the corresponding compartment falls below the pressure in the other compartment by a predetermined value, each of said seats and the corresponding seating surfaces being of substantially less area than the wall portions defining the compartments respectively, the size of said opposed openings being such that the area of said diaphragm exposed to air pressure within said corresponding chamber is at least substantially reduced when said diaphragm is so pressed against said opening whereby said diaphragm may remain in closing position when the pressure within the two compartments becomes equal, said diaphragm being self-returnable to a position midway between said opposed openings when air pressure from said common source is released.

6. A safety valve for passing air from a common source of pressurized air simultaneously to a pair of air lines and for stopping the flow of air to either of said air lines in the event of leakage therefrom, said valve comprising a casing, including two dished casing sections secured together to form a chamber, a diaphragm of planar form clamped at its peripheral portion between said casing sections in normally planar condition and dividing said chamber into two compartments, inlet openings leading into said compartments connectible to the common source of air under pressure, opposed outlets leading from said compartments centrally thereof and a seat in said compartments surrounding each of said outlets, said diaphragm being formed of a sheet of flexible, resilient material and having embedded therein at its peripheral portion, including the portion clamped between said casing sections and a portion extending into said chamber and bonded to said diaphragm, an annular member of rigid material coplanar with the diaphragm and terminating short of said seats whereby the central portion of said diaphragm located between said seats and a portion outwardly thereof is flexible, said diaphragm having a section of reduced wall thickness in the portion in which this annular member is embedded.

7. A safety valve for passing air from a common source of pressurized air simultaneously to a pair of air lines and for stopping the flow of air to either of said air lines in the event of leakage therefrom, said valve comprising a casing, including two dished casing sections secured together to form a chamber, a diaphragm of planar form clamped at its peripheral portion between said casing sections in normally planar condition and dividing said chamber into two compartments, inlet openings leading into said compartments connectible to the common source of air under pressure, opposed outlets leading from said compartments centrally thereof and a seat in said compartments surrounding each of said outlets, said diaphragm being formed of a sheet of flexible, resilient material and having a section of reduced wall thickness inwardly of the clamped portion and outwardly of the central portion and an annular member of rigid material embedded in and co-planar with said diaphragm section of reduced wall thickness and extending radially outwardly into the clamped portion and radially inwardly to short of the central portion of the diaphragm and bonded to said diaphragm whereby the central portion of the diaphragm between the seats and a portion outwardly thereof is flexible.

References Cited in the file of this patent

UNITED STATES PATENTS

| | | |
|---|---|---|
| 2,225,081 | O'Hare | Dec. 17, 1940 |
| 2,246,621 | Davis | June 24, 1941 |
| 2,604,900 | Hewitt | July 29, 1952 |
| 2,710,620 | Watson | June 14, 1955 |
| 2,736,332 | Simmons | Feb. 28, 1956 |
| 2,773,511 | Mercier | Dec. 11, 1956 |
| 2,776,812 | Colendar | Jan. 8, 1957 |
| 2,778,373 | Jaquith | Jan. 22, 1957 |
| 2,906,281 | Pillote | Sept. 29, 1959 |

FOREIGN PATENTS

| | | |
|---|---|---|
| 361,532 | Great Britain | Nov. 26, 1931 |
| 482,935 | Great Britain | Apr. 7, 1938 |
| 667,180 | Great Britain | Feb. 27, 1952 |
| 539,895 | Great Britain | Sept. 29, 1958 |